UNITED STATES PATENT OFFICE.

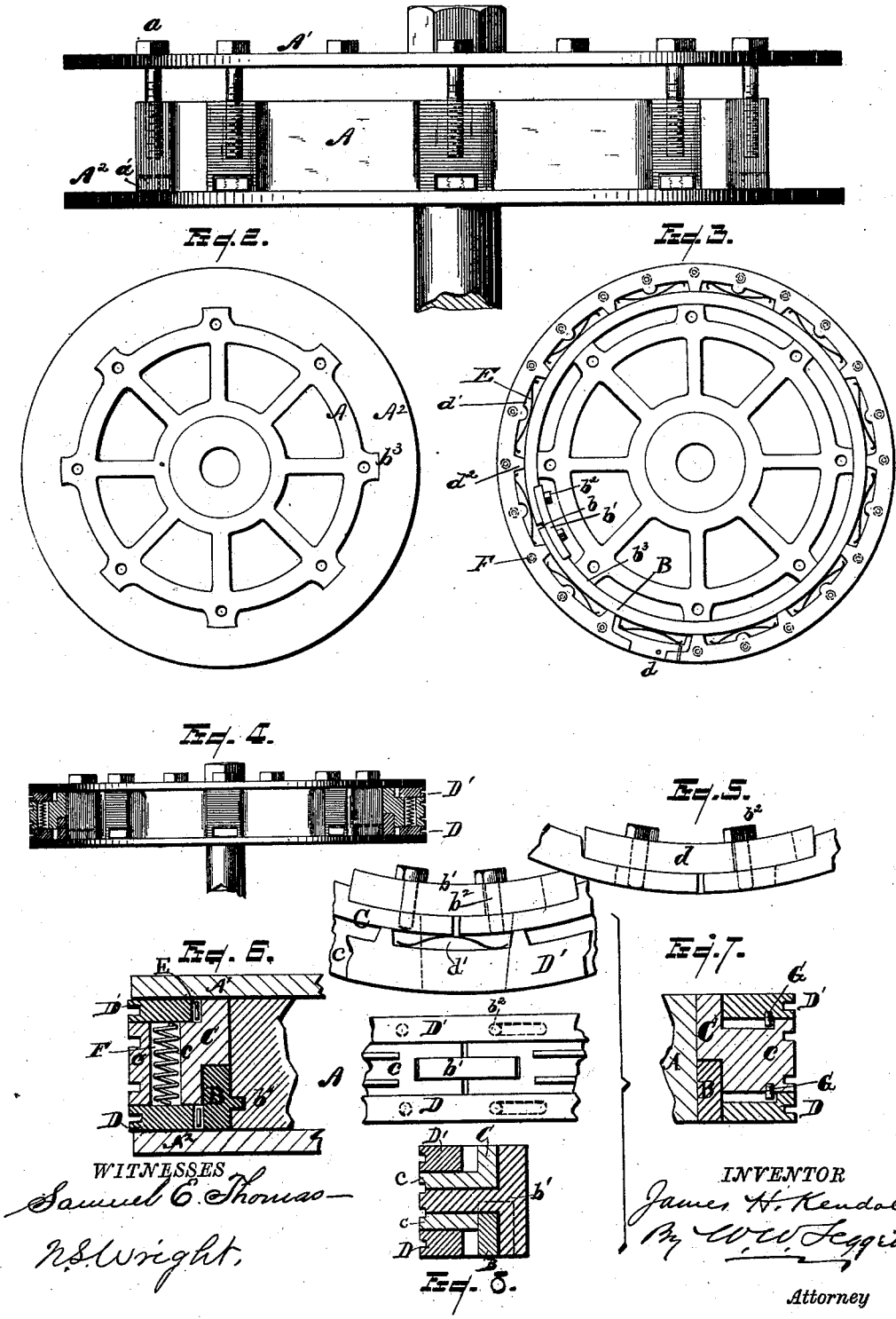

JAMES H. KENDALL, OF DETROIT, MICHIGAN.

PISTON-PACKING.

SPECIFICATION forming part of Letters Patent No. 360,963, dated April 12, 1887.

Application filed December 30, 1886. Serial No. 223,016. (No model.)

*To all whom it may concern:*

Be it known that I, JAMES H. KENDALL, of Detroit, county of Wayne, State of Michigan, have invented a new and useful Improvement in Piston-Packing; and I declare the following to be a full, clear, and exact description of the invention, such as will enable others skilled in the art to which it pertains to make and use it, reference being had to the accompanying drawings, which form a part of this specification.

My invention consists of the combinations of devices and appliances hereinafter specified, and more particularly pointed out in the claims.

In the drawings, Figure 1 is a view in elevation of a piston with its rings removed, and also with the follower removed. Fig. 2 is a plan view of the structure shown in Fig. 1 with the follower removed. Fig. 3 is a plan view of the same with my packing-rings in place; Fig. 4, a sectional view with my packing-rings in place and with the follower in its place on the piston. Fig. 5 is a separate view of a ring illustrating how a re-enforcing section may be employed at the point or points where the ring is separated. Fig. 6 illustrates how the inner ring farthest from the follower may be engaged firmly with the body of the piston. Fig. 7 illustrates how steady-pins are employed to prevent rotation of the piston-rings. Fig. 8 shows in plan, elevation, and section how one segmental block is employed with rings B and C.

My invention has for its object the production of a packing-ring arrangement for pistons which shall accomplish not only a thorough packing of the piston, but which shall hold the expansion-rings to their work, causing them to bear evenly and uniformly against the bore of the cylinder, and, while permitting a free expansion of the rings, to compensate at all times for any wear upon the front and rear faces or parallel plane-faces of the rings, the rings being at all times held firmly against the follower and the piston-flange, and so obviate any tendency to cramp or bind by tilting.

To this end A represents any ordinary piston-head constructed for the use of piston-ring packing. A' is the follower, and $A^2$ the piston-flange.

$a$ represents the usual bolts for holding the follower in place, and $a'$ represents brass nuts set into corresponding recesses to engage the bolts $a$.

The construction thus far described is of any ordinary kind and forms no part of my invention, which is of course equally applicable to all pistons, however made, that shown in the drawings being only one of the actual constructions to which my improvement has been applied.

B is a ring. It is first passed down over the piston A and rests against the piston-flange. It may be a solid ring, or it may be severed at one or more points. I prefer to sever it at one point, as, for instance, at $b$. At the point or points where it is severed it may be united by segmental blocks $b'$ and bolts $b^2$, one of the bolt-holes in the said segment being slightly elongated. There is thus provided means whereby the ring may be slightly opened or expanded by shims of tin or other material, which may be placed between the inner periphery of the ring and the piston A, as, for instance, at the points $b^3$, shown in Fig. 3.

$b^4$ is a stud projecting from the ring B and engaging in a slot in the piston A, the object being to hold the ring B firmly down to its seat against the flange without liability of disturbing the same when the ring C is removed.

C is another ring superposed upon the ring B. This has a projecting portion, $c$, which extends out to the bore of the cylinder, leaving spaces in front and behind it, in which the packing-rings proper or expansion-rings are located. This ring C is, like the ring B, preferably divided at one or more points, and at these points is provided with segmental blocks; and I prefer generally that the same segmental blocks shall serve at the same time for both rings B and C, as shown in Fig. 8.

D D' represent the packing-rings proper or expansion-rings. They are adapted to fit snugly but movably in their places between the follower and the flange, and in advance of and the rear of the projecting portion $c$ of the ring C. These rings are, like the others, preferably divided at one point on the periphery, although they may be divided at one or more points, and at these points there may or may not be employed segmental blocks $d$. In this case the blocks, if employed, are not fastened to the ring, or, if fastened, are fastened at only one end.

E represents suitable semi-elliptic or other springs. They are located in suitable recesses $d'$, back of the expansion-rings D D'. They serve to expand the packing-rings D D' always against the surface of the cylinder.

Should there at any time be any considerable wear, the rings D D' may be shimmed out somewhat by shims of tin or other material placed back of the projections $d^2$, shown in Fig. 3.

Spiral springs F are located in the projecting portions $c$ of the ring C and serve to press the rings D D' firmly against the flange of the piston and follower, respectively, and so by keeping them firmly against these surfaces they obviate any tendency of the ring D D' to tilt, and so cramp at their edges against the bore of the cylinder. Steady-pins G may be located at intervals to prevent rotation of the rings D D'.

Where the segmental blocks are employed, as has been explained, I prefer, generally, that they not only be recessed into the inner faces of peripheries of the rings, but that the rings shall be rabbeted, so as to make a portion of the block to project out to the outer periphery of the ring and receive upon its face the same wear that is experienced by the ring itself.

To put the packing-rings in place, remove the follower, then introduce the ring B, and rotate it slightly to engage the stud $b^4$ with its slot. Then adjust the ring D in its proper place and introduce the springs E back of the expansion-ring D. Then put the ring C into position upon the ring B, introduce the spiral springs F, and adjust the ring D' in its proper position with its springs E. Then put the follower upon the piston and screw it down firmly to its seat. This binds the rings B and C firmly together, while the rings D and D' are permitted to expand freely under the action of the semi-elliptic springs E, and are held snugly against the piston-flange and follower, respectively, by the spiral springs F.

Now, if at any time it is desired to gain access to the different parts, the follower may be removed, and one may then lift from the piston the ring C, and with it the expansion-ring D', without disturbing the semi-elliptic springs which are inside the inner periphery of the ring D'. This can be done without in any way disturbing the ring B, and the expansion-ring with its springs, and so the engineer is enabled at any time to readily get at and cleanse all the parts or to shine up the rings, and to accomplish his work quickly and with ease, since he is not obliged in any way to disturb the springs.

This construction is at once very simple and efficient, and accomplishes in a thorough and practical manner the packing of the piston, while all its parts are made readily accessible if it becomes necessary.

It will be observed that the ring C projects out to the cylinder-bore, and that when wear upon the piston takes place it may be compensated by expanding the ring C or the rings C and B and shimming up back of these rings. This serves practically to compensate for the wear upon the piston and cylinder, and so, while it takes up the wear, it again centers the piston within the bore. This accomplishes another purpose. It prevents any lateral play of the piston in the cylinder. Any such lateral play would cause wear upon those faces of the expansion-rings D D' which are adjacent to the piston flange and follower, and this expansion of the ring C, by centering the piston, overcomes this motion and consequent wear.

What I claim is—

1. A piston-packing consisting of expansion-rings D D', in connection with independent rings B C and springs E, for expanding them against the bore of the cylinder, substantially as and for the purposes described.

2. A piston-packing consisting of expansion-rings D D', in connection with independent rings B and C, springs E, for expanding the rings against the bore of the cylinder, and springs F, for holding the expansion-rings respectively against the piston-flange and follower, substantially as and for the purposes described.

3. The combination, in a piston-packing, of independent rings B and C, whereby access can be had to each expansion-ring and the same be removed for cleansing or repairs without disturbing its relation with the springs whereby it is expanded against the cylinder-bore, substantially as described.

4. In a piston-packing, the combination with the ring B, of a stud-and-slot connection with the piston-head, whereby the ring B is caused to remain undisturbed by the act of moving the rings C and D', substantially as described.

5. The combination, with the rings D, D', and B, of the ring C, projecting out to the surface of the bore, said ring divided at one or more points and adapted to be shimmed out to take up wear and center the piston within the cylinder, substantially as described.

6. In a piston-packing, the combination, with the ring C, of expansion-rings D D', and springs F, for pressing the expansion-rings respectively against the piston-flange and follower, substantially as and in the manner described.

In testimony whereof I sign this specification in the presence of two witnesses.

JAMES H. KENDALL.

Witnesses:
 N. S. WRIGHT,
 M. B. O'DOGHERTY.